United States Patent [19]

Landi

[11] Patent Number: 5,110,653
[45] Date of Patent: May 5, 1992

[54] SHOCK ABSORBING WRAP FOR SPORTING EQUIPMENT

[75] Inventor: Curtis L. Landi, Mountain View, Calif.

[73] Assignee: Supracor Systems, Inc., Sunnyvale, Calif.

[21] Appl. No.: 625,504

[22] Filed: Dec. 11, 1990

[51] Int. Cl.⁵ .............................................. B32B 3/12
[52] U.S. Cl. ....................................... 428/116; 428/72; 428/73; 428/118; 428/37; 273/73 F; 273/73 J; 273/75; 273/81 R; 206/521; 206/522
[58] Field of Search ............. 273/73 C, 73 D, 73 F, 273/73 H, 73 J, 75, 81 R, 67 A, 73 K; 428/116, 118, 71, 72, 73, 37, 909, 178; 206/521, 523, 522, 594, 320, 446

[56] References Cited

U.S. PATENT DOCUMENTS

| | | | |
|---|---|---|---|
| 3,837,991 | 9/1974 | Evans | 428/116 |
| 3,848,480 | 11/1974 | Oseroff | 273/75 |
| 4,136,222 | 1/1979 | Jonnes | 428/178 |
| 4,287,250 | 9/1981 | Rudy | 428/178 |
| 4,347,280 | 8/1982 | Lau | 273/75 |
| 4,422,183 | 12/1983 | Landi | 428/116 |
| 4,627,635 | 12/1986 | Koleda | 273/73 J |
| 4,660,832 | 4/1987 | Shomo | 273/73 J |

FOREIGN PATENT DOCUMENTS

| | | | |
|---|---|---|---|
| 2274514 | 1/1976 | France | 206/521 |
| 602129 | 7/1978 | Switzerland | 273/75 |

Primary Examiner—Ellis P. Robinson
Assistant Examiner—Nasser Ahmad
Attorney, Agent, or Firm—Rosenblum, Parish & Bacigalupi

[57] ABSTRACT

A shock absorbing wrap for sporting equipment that will absorb vibrations felt by a player using said equipment as well as aid the players grip on the equipment. The wrap may be wound in an overlapping fashion and securely clamped in place or it may be adhered to the piece of equipment. The outer facing of the wrap can be perforated to provide a non-slip surface. Alternatively, the wrap can be used underneath a more traditional leather wrap.

7 Claims, 3 Drawing Sheets

5,110,653

SHOCK ABSORBING WRAP FOR SPORTING EQUIPMENT

BACKGROUND OF THE INVENTION

1. Field of the Invention

This invention relates generally to devices for dampening vibration, and more particularly to a flexible wrap that is used to enshroud the handles of sporting equipment in order to dampen vibrations generated during the use of said equipment.

2. Brief Description of the Prior Art

Most wraps are used on sporting equipment to enhance the player's grip on the equipment. For example, tennis and racquetball rackets are wrapped in thin leather that has been perforated throughout, in order to reduce slippage between the racket handle and the player's hand. Likewise, baseball bats, golf clubs, hockey sticks, etc., are wrapped with various materials in order to provide a non-slip grip.

The existing equipment wraps do not absorb energy. They are not capable of dampening the vibrations inherent in the use of such sporting equipment. Spenco® sells a patented handlebar grip which claims to absorb pressure, vibrations and friction. However this padding is very thin and is used only under a polypropylene cover.

SUMMARY OF THE INVENTION

It is therefore an objective of the present invention to provide vibration dampening means for sporting equipment comprising a wrap having flexible, thermoplastic elastomeric honeycomb as its core and at least one sheet of slip resistant facing bonded thereto.

Another objective of the present invention is to provide shock absorbing means for sporting equipment that is used externally on said equipment in the area where the player grips the equipment.

A further objective of the present invention is to provide a wrap to be used in the grip area of sporting equipment that provides shock absorption in addition to prohibiting slippage between the player's hand and the handle of the equipment.

Briefly, a preferred embodiment of the present invention includes a narrow strip of thin, flexible, thermoplastic elastomeric honeycomb bonded to at least one sheet of resilient facing material. The honeycomb is wrapped around the handle or gripped portion of an item of sporting equipment. Because the honeycomb absorbs shock, it will dampen the vibrations experienced during the use of such equipment. In addition, the outer surface of the facing material inhibits slipping between the player's hand and the handle of the equipment, ensuring a solid grip.

An important advantage of the present invention is that the wrap is made from thermoplastic and thermoplastic elastomeric materials which have inherent vibration dampening characteristics.

Another advantage of the present invention is that it provides a wrap that is lightweight, as is desired by sporting equipment users.

A further advantage of the present invention is that the wrap is highly durable and will not degrade with repeated use.

Yet another advantage of the present invention is that the wrap provides shock absorption in addition to a non-slip surface.

These and other objects and advantages of the present invention will no doubt become apparent to those skilled in the art after having read the following detailed description of the preferred embodiment which is contained in and illustrated by the various drawing figures.

IN THE DRAWING

DETAILED DESCRIPTION OF THE PREFERRED EMBODIMENT

Figure 1:
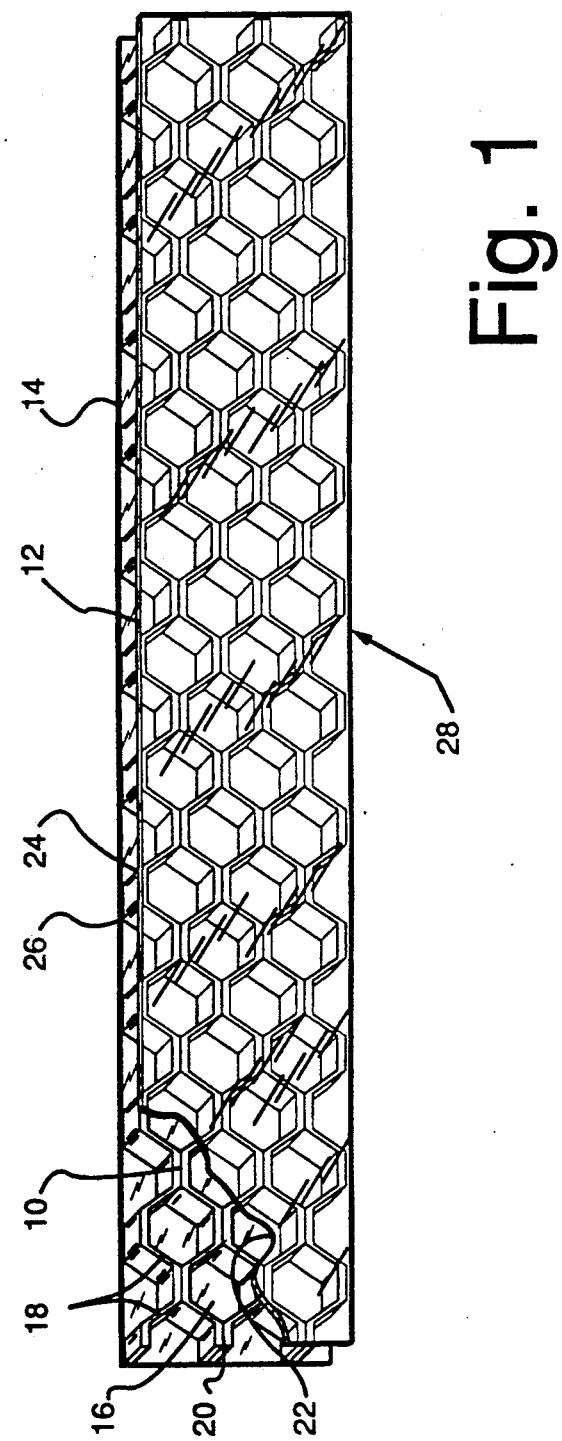
FIG. 1 is a perspective view of a strip of wrap of the present invention having two transparent facings, one of which is partially broken to reveal the honeycomb construction of the core material.

FIG. 1 illustrates a preferred embodiment of a strip of shock absorbing wrap 28 in accordance with the present invention. The core 10 is made from vibration dampening thermoplastic elastomeric material that has a honeycomb construction. Two transparent thermoplastic facings 12 and 14 are shown, although in an alternative embodiment only one need be used.

The honeycomb core 10 is made from sheets of an advanced grade thermoplastic elastomeric material that are compression bonded together at intermittently spaced intervals staggered between alternate sheets. This pattern of bonding creates a honeycomb network of generally hexagonally shaped cells when the bonded stack of sheets is expanded.

Each cell 16 of the honeycomb core 10 is defined by four generally S-shaped wall segments, each of which is shared by an adjacent cell. The wall segments of each cell 16 include single thickness wall portions 18 and double thickness wall portions 20 and 22, the latter portions being disposed on each side of the cell where the side wall of one cell is compression bonded to the side wall of an immediately adjacent cell.

The upper and lower extremities of the walls forming the several cells are deformed during a planarization operation disclosed in our copending U.S. patent application Ser. No. 07/446,320 filed Dec. 4, 1989, and create upper and lower surfaces 24 and 26 of the honeycomb core. Facings 12 and 14, made from a resilient thermoplastic material, are then compression bonded to the top and bottom surfaces 24 and 26 while the core is held in an expanded configuration. The addition of the facings encapsulates air within each cell.

The wrap's superior shock absorption and springback characteristics result in part from the use of encapsulated air as well as the use of thermoplastic (or thermoplastic elastomeric) materials for both the honeycomb core 10 and the facings 12 and 14. Other favorable characteristics of the wrap include durability and tear resistance.

Another important characteristic of this wrap is its anisotropic three-dimensional structure which has varying degrees of flex in its length, width and thickness dimensions. Selected combinations of elastomeric material, honeycomb cell configuration, core thickness and facing material variables will determine the wrap's stiffness or softness, rigidity or flex.

The honeycomb cored wrap can be faced on one side only or on both sides. The wrap's shock absorption capabilities as well as its flexibility will differ in each of these embodiments. Wrap that is faced on one side only will absorb less shock than wrap that is doubly faced. This is due to the lack of encapsulated air in the singly faced wrap. However, singly faced wrap will have a greater flexibility than doubly faced wrap. Singly faced wrap would be desirable where the wrap would be wound around a small circumference, as in a handle of a golf club for example. For equipment having a small circumference and needing greater vibration dampening, doubly faced wrap having a thin core (the distance between the facings) can be used.

Environmental additives can be incorporated into the material of the thermoplastic padding to combat the effects of body fluids, direct sun and other environmental hazards normally experienced by sporting equipment. A yellowing preventative and/or colors can also be added, and might be appropriate where the wrap is used on the external surfaces of sporting equipment (as will be further explained below).

Figure 2:
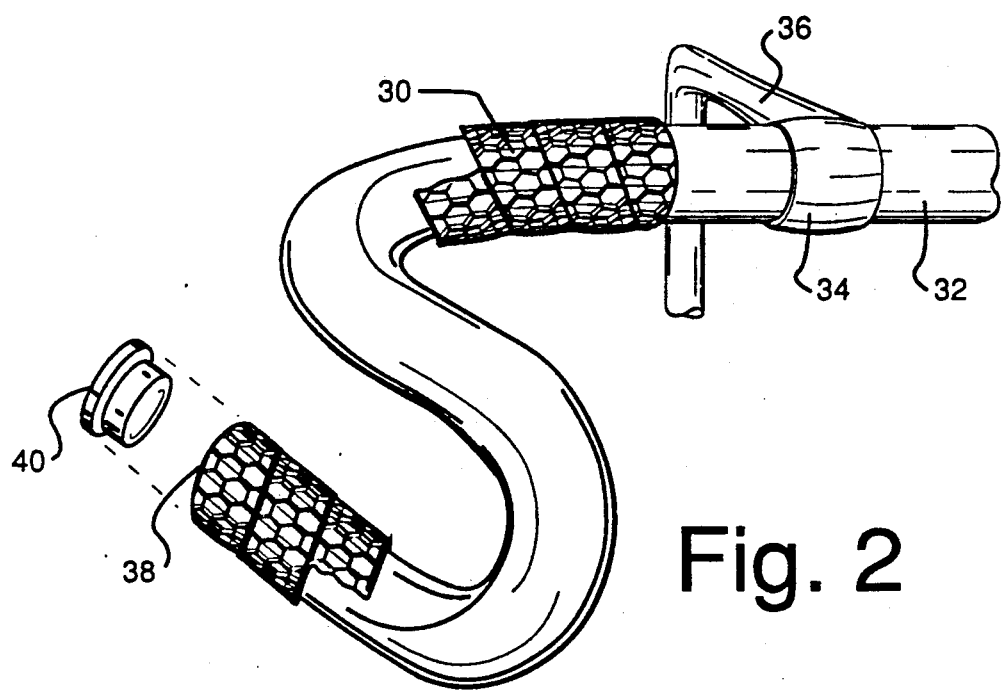
FIG. 2 is a perspective view of a partial bicycle handlebar enshrouded in a wrap of the present invention.

FIG. 2 illustrates how singly faced wrap 30 would encompass a cylindrical body such as a bicycle handlebar 32. As illustrated, the wrap 30 is placed against the handlebar 32 with the faced side up. In other words, the bare honeycomb core is directly touching the handlebar. The wrap 30 is shown covering the length of one half of the handlebar 32, starting at a point proximate the midsection 34 of the handlebar where the handlebar is connected to the handlebar tube 36. The wrap 30 is wound around the handlebar 32 in an overlapping fashion throughout the curved length of the handlebar 32. At the open end 38 of the bar, the wrap is secured by either adhesion or by being clamped between the open end 38 of the handlebar and the handlebar end cap 40. In an alternative embodiment, the wrap may be wound around the handlebar in a non-overlapping fashion and adhered to the bar for security.

Figure 3:
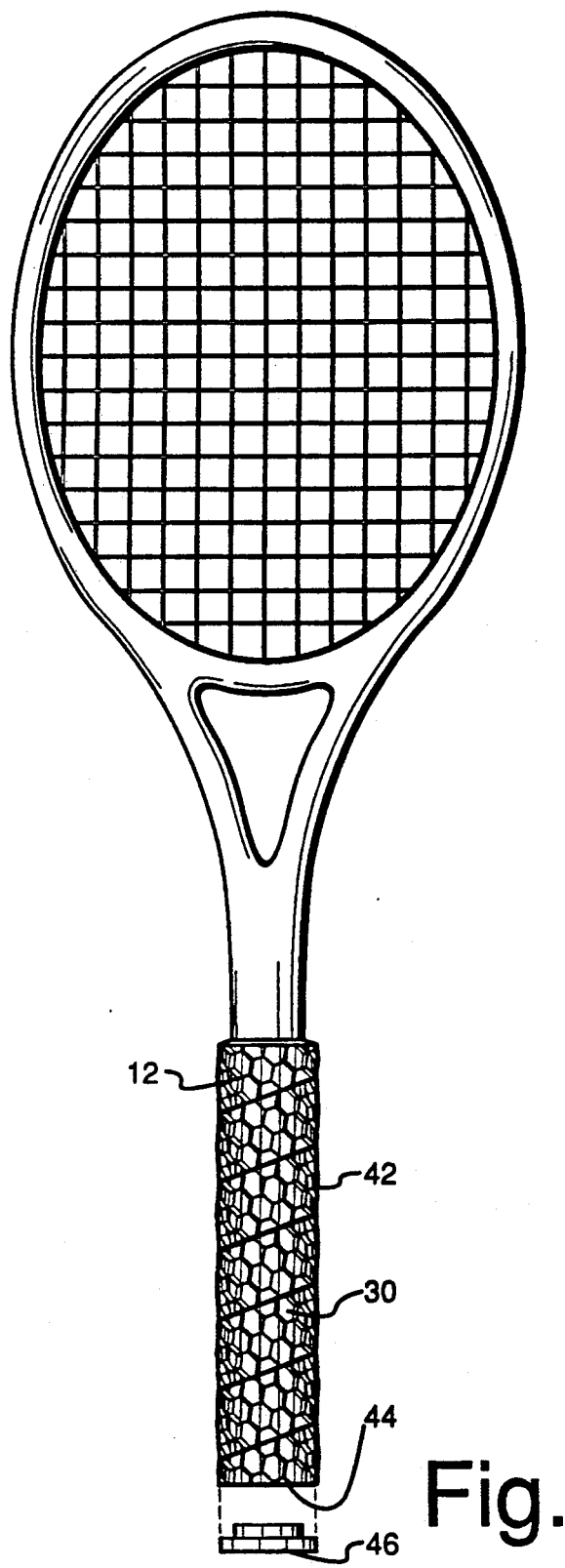
FIG. 3 is a front view of a tennis racket whose handle is wrapped in a thermoplastic honeycomb material of the present invention.

FIG. 3 illustrates a tennis racket whose handle 42 is the body of the grip that is enshrouded in wrap 30 having a non-slip surface. Similar to the bicycle handlebar 32 of FIG. 2, the wrap 30 is wound around the handle 42 in an overlapping fashion. A matrix of evenly spaced holes in the facing sheet 12 ensure the player a firm grip. Again like the bicycle handlebar 32, the wrap 30 can be either adhered to the racket handle 42 or secured by clamping the wrap between the end of the handle 44 and the handle's end cap 46.

As an alternative, non-perforated, single faced or doubly faced wrap can be used on a tennis racket handle underneath the usual leather wrap. This embodiment would allow for the retention of the familiar leather wrap, with the addition of a layer of shock absorbing wrap below to reduce vibrations in the racket.

The honeycomb core 10 of the wrap 30 contains wall segments 18, 20 and 22 that are flexible and resilient. A force upon the wrap in a direction normal to the surface of the wrap will cause the walls of the cells experiencing the force to buckle and deflect in a direction toward the force. When the force is removed, the walls will regain their upright stance. Therefore, the walls of the cells of a tennis racket wrap or bicycle handle wrap will deflect toward the user's palm and digits. At the location where the user is holding the equipment handle, the wrap is recessed due to the pressure of the user's grip. This indentation helps secure the user's grip on the wrapped piece of equipment.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An improved wrap used to form a hand gripping surface for a generally cylindrically shaped handle, comprising:
   a generally rectangularly shaped anisotropic three-dimensional structured body of wrapping material including
   a core made from strips of flexible thermoplastic elastomeric material bonded together to form the walls of a honeycomb network of generally hexagonally shaped cells, the walls of said cells each having upper edges and lower edges;
   a first sheet of resilient slip resistant facing material, thermal compression bonded to one surface of said core formed by either said upper edges or said lower edges; and
   said body of material being wrappable about a handle and securable thereto such that the outer surface thereof forms said hand gripping surface.

2. An improved vibration dampening wrap as recited in claim 1 wherein said body further includes a second sheet of resilient facing material, thermal compression bonded to the other surface of said core.

3. An improved vibration dampening wrap as recited in claim 1 wherein said body of wrapping material has a generally rectangular configuration such that a single body of wrap may be used to enshroud a cylindrical handle in a single layer.

4. An improved vibration dampening wrap as recited in claim 1 wherein said body of wrapping material is constructed as an elongated strip which may be used to enshroud a cylindrical body in a consecutive, overlapping fashion.

5. An improved vibration dampening wrap as recited in claim 1 further including a second layer of wrap comprising natural or synthetic material disposed in enshrouding relationship to and on top of the first mentioned layer of shock absorbing wrap.

6. An improved vibration dampening wrap as recited in claim 1 wherein said wrap is adapted for use on the cylindrical handle portion of a sports racket.

7. An improved vibration dampening wrap as recited in claim 1 wherein said wrap is adapted for use on the cylindrical handle of a bicycle handlebar.

* * * * *